United States Patent [19]

Moy

[11] Patent Number: 6,031,817

[45] Date of Patent: Feb. 29, 2000

[54] SYSTEM AND METHOD FOR PROVIDING NOTIFICATION OF MALFUNCTIONS IN A DIGITAL DATA NETWORK

[75] Inventor: John T. Moy, Acton, Mass.

[73] Assignee: Cascade Communications Corporation, Westford, Mass.

[21] Appl. No.: 08/773,237

[22] Filed: Dec. 23, 1996

[51] Int. Cl.$^7$ .................................. H04J 1/16; H04J 3/14
[52] U.S. Cl. ............................................ 370/216; 370/225
[58] Field of Search ..................................... 370/217, 216, 370/218, 221, 225, 252, 254; 340/827; 395/180, 181, 182.01, 181.02; 714/1, 2, 3, 4

[56] References Cited

U.S. PATENT DOCUMENTS

| | | | |
|---|---|---|---|
| 4,993,015 | 2/1991 | Fite, Jr. ..................................... | 370/218 |
| 4,999,829 | 3/1991 | Fite, Jr. et al. .......................... | 370/218 |
| 5,365,520 | 11/1994 | Wang et al. .............................. | 370/217 |
| 5,495,471 | 2/1996 | Chow et al. .............................. | 370/221 |

*Primary Examiner*—Ajit Patel
*Attorney, Agent, or Firm*—Weingarten, Schurgin, Gagnebin, & Hayes LLP

[57] ABSTRACT

A network comprises a plurality of switching nodes interconnected by communication links. The nodes transfer message packets thereamong over the communication links over paths defined through the nodes over the communication links. At least one of the nodes includes a communication link operational status determination element and an advertising message packet broadcast element. The communication link operational status determination element determines the operational status of the communication links, and the advertising message packet broadcast element broadcasts advertising message packets over the network including the operational status of the communication links. The other switching nodes in the network receive the advertising message packets and determine from the operational status identifier values whether to initiate a re-routing operation to re-route a path to avoid communication links which are malfunctioning. In a refinement, the one switching node further includes a communication link instance identifier and a communication link instance identifier control. The communication link instance identifier provides communication link instance values for the communication links connected to the switching node, and the communication link instance identifier control for controlling the communication link instance value provided by the communication link instance identifier in relation to the operational status determined by the communication link operational status determination element. The advertising message packet broadcast element further includes communication link instance values in the advertising message packets. The other switching nodes further determine from the communication link instance identifier whether to initiate a re-routing operation to re-route paths maintained thereby nodes to avoid the malfunctioning communication link.

7 Claims, 10 Drawing Sheets

SYSTEM AND METHOD FOR PROVIDING NOTIFICATION OF MALFUNCTIONS IN A DIGITAL DATA NETWORK

FIELD OF THE INVENTION

The invention relates generally to the field of digital networking systems, and particularly to systems and methods for providing notification of malfunctions in the network which may necessitate re-routing of virtual circuits for transferring message packets through the network.

BACKGROUND OF THE INVENTION

Digital networks have been developed to facilitate the transfer of information, including data and programs, among digital computer systems and numerous other types of devices. A variety of types of networks have been developed and implemented using diverse information transfer methodologies. In modern networks, information is transferred through a mesh of switching nodes which are interconnected by communication links in a variety of patterns. The mesh interconnection pattern can allow for a number of paths to be available through the network from each computer system or other device which may transmit information as a source device, to another computer system or other device, which is to receive the information as a destination device, so that if one switching node or communication link is congested or becomes inoperative, the information can be routed around the congested or inoperative portion of the network.

Information transferred from a source device to a destination device is generally transferred in the form of fixed- or variable-length packets, which are transferred through the network in accordance with one of several general packet transfer methodologies. In one packet transfer methodology, termed a virtual circuit transfer methodology, packets are transferred through the network over constructs which are generally termed "virtual circuits," "virtual connections" and the like (generally, "virtual circuits"). When a "source" device wishes to engage in a communication session with another "destination" device, during which it (that is, the source device) will transfer information to the destination device, initially a preliminary operation will be performed to establish a virtual circuit through a series of switching nodes and over respective communication links defining a path from the source device to the destination device. Each switching node in the virtual circuit methodology is provided with a virtual circuit database that associates each of the virtual circuits maintained by the respective switching node with a particular one of the communication links connected thereto.

After the virtual circuit has been established, the switching node, when it receives a packet for a particular virtual circuit, will use the virtual circuit database to identify the particular communication link connected thereto over which it is to transfer the packet. At the end of the communications session between the source device and the destination device, the devices may close the virtual circuit. In that operation, one or more packets are transferred between the source and destination devices which, among other things, can enable the switching nodes along the virtual circuit to expunge the virtual circuit information relating to the particular virtual circuit being closed from their respective virtual circuit databases. Thereafter, various resources which are associated with the closed virtual circuit can be used for other virtual circuits.

One problem in connection with use of the virtual circuit methodology arises from the following. Generally, if a communication link in a network becomes inoperative, all of the virtual circuits which make use of the communication link are dropped, and may need to be re-established. Typically, when a switching node determines that a communication link connected thereto is inoperative, it will transmit a "dropped" message packet over each of the virtual circuits indicating that the virtual circuit has been dropped. Each switching node along the path defined by the respective virtual circuit will receive the dropped message packet, free the resources taken up by the dropped virtual circuit, and pass the dropped message packet along the path defined by the virtual circuit. These operations will be repeated until the dropped message packets are received by both the source and destination devices. A problem arises from the fact that, if a communication link is used for a large number of virtual circuits, the switching nodes connected to that communication link will need to generate and transmit a large number of such dropped message packets, which can take up a significant amount of packet transfer bandwidth through at least some portion of the network.

SUMMARY OF THE INVENTION

The invention provides a new and improved system and method for providing notification of malfunctions of communication links to switching nodes in a digital data network, which facilitates a reduction in the packet transfer bandwidth which is otherwise required to provide such notification.

In brief summary, the invention provides a network comprising a plurality of switching nodes interconnected by communication links. The nodes transfer message packets thereamong over the communication links over paths defined through the nodes over the communication links. At least one of the nodes includes a communication link operational status determination element and an advertising message packet broadcast element. The communication link operational status determination element determines the operational status of the communication links, and the advertising message packet broadcast element broadcasts advertising message packets over the network including the operational status of the communication links. The other switching nodes in the network receive the advertising message packets and determine from the operational status identifier values whether to initiate a re-routing operation to re-route a path to avoid communication links which are malfunctioning.

In a refinement, the one switching node further includes a communication link instance identifier and a communication link instance identifier control. The communication link instance identifier provides communication link instance values for the communication links connected to the switching node, and the communication link instance identifier control for controlling the communication link instance value provided by the communication link instance identifier in relation to the operational status determined by the communication link operational status determination element. The advertising message packet broadcast element further includes communication link instance values in the advertising message packets. The other switching nodes further determine from the communication link instance identifier whether to initiate a re-routing operation to re-route paths maintained thereby nodes to avoid the malfunctioning communication link.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
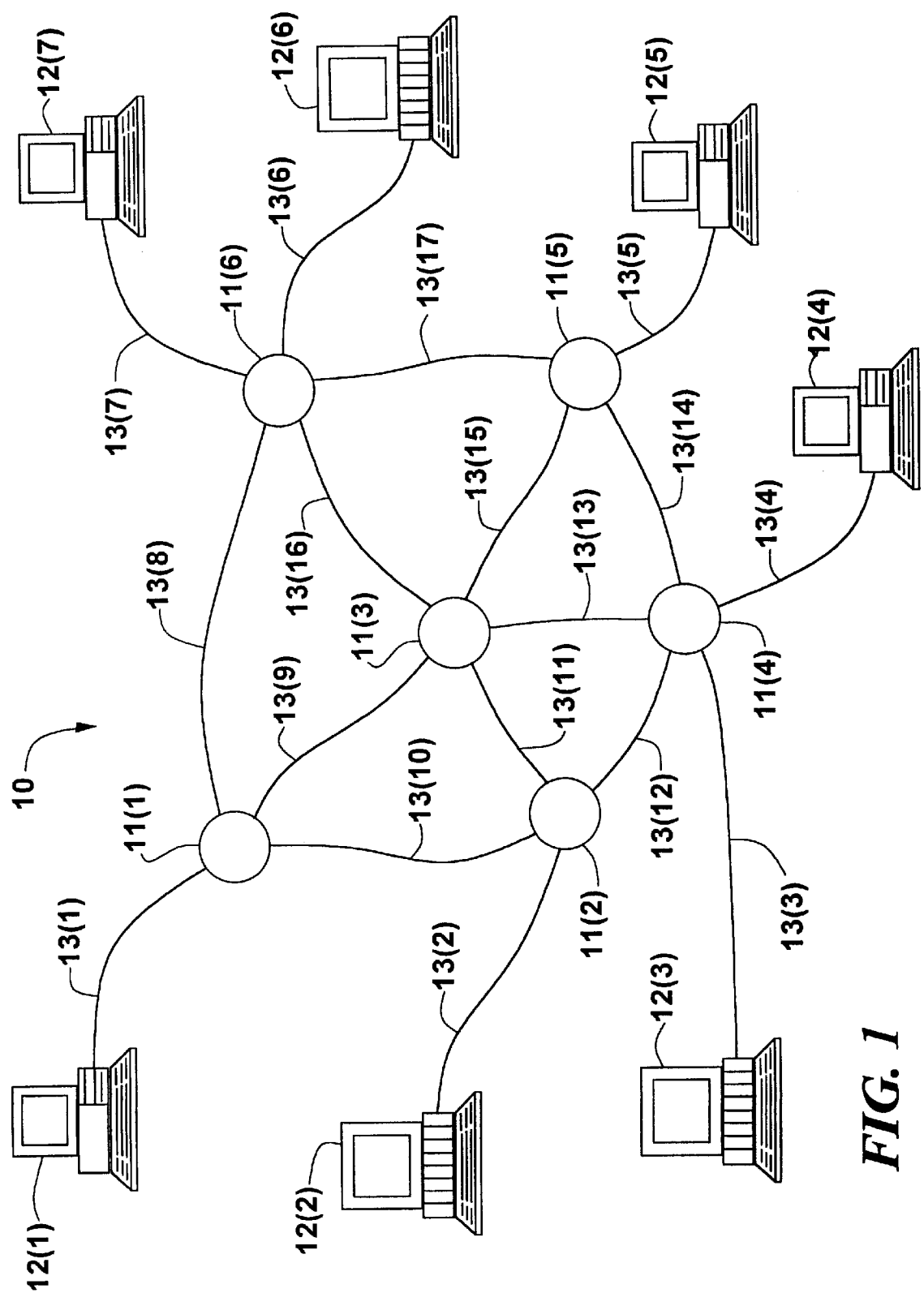
FIG. 1 schematically depicts a computer network constructed in accordance with the invention.

FIG. 1 schematically depicts a computer network 10 including a plurality of switching nodes $11(l)$ through $11(N)$ (generally identified by reference numeral $11(n)$) for transferring signals representing data among a number of devices, which in FIG. 1 are represented by computer systems $12(l)$ through $12(M)$ (generally identified by reference numeral $12(m)$). The computer systems $12(m)$, as is conventional, process data, in accordance with their program instructions to generate processed data. In their processing, a computer system $12(m_S)$ (subscript "S" referencing "source") may, as a source computer system, need to transfer data, processed data and/or program instructions (all of which will be referred to herein generally as "information") to another, destination, computer system $12(m_D)$ (subscript "D" referencing "destination"), which may use the transferred information in its operations.

Each computer system $12(m)$ is connected over a communication link, generally identified by reference numeral $13(p)$, to a switching node $11(n)$ to facilitate transmission of data thereto or the reception of data therefrom. The switching nodes $11(n)$ are interconnected by communication links, also generally identified by reference numeral $13(p)$ to facilitate the transfer of information among the respective switching nodes $11(n)$. The communication links $13(p)$ may utilize any convenient information transmission medium, including, for example, wires for carrying electrical signals, fiber optic links for carrying optical signals, and so forth. Each communication link $13(p)$ is preferably bi-directional, allowing the switching nodes $11(n)$ to transmit and receive signals among each other and with computer systems $12(m)$ connected thereto over the same link; depending on the particular type of medium selected for respective communication links $13(p)$, multiple media may be provided for transferring signals in opposite directions. Information may be transferred among the computer systems $12(m)$ through the network 10 over virtual circuits in a conventional manner.

The invention is directed to a mechanism by which the switching nodes $11(n)$ in the network notify each other when a communication link $13(p)$ malfunctions or otherwise becomes inoperative (generally, "malfunctions"), and operations performed by the switching nodes in response thereto. When a communication link $13(p)$ malfunctions, all of the virtual circuits which use that communication link as part of their respective paths, and will need to be re-established before they can be used to carry packets. In accordance with the invention, the switching nodes $11(n)$ use information from "advertising" message packets, which each of the switching nodes $11(n)$ periodically generates and broadcasts throughout the network 10, to determine when a communication link has malfunctioned and that virtual circuits which use that communication link have been dropped.

Each advertising message packet contains local topology information for the particular switching node $11(n)$ which originated the advertising message packet, including the identification of the switching node $11(n)$ which originated the advertising message packet, the switching nodes $11(n')$ ($n' \neq n$) which are connected directly to the switching node $11(n)$ which originated the advertising message packet, and the operational status of the communication links $13(p)$ that interconnect the switching node $11(n)$ and the switching nodes $11(n')$ connected thereto. The collection of the local topology information received from all of the switching nodes $11(n)$ defines the topology of the network 10 and can be used by each switching node $11(n)$ in determining paths through the network to each of the other switching nodes $11(n')$ ($n' \neq n$) for virtual circuits or otherwise.

In connection with the invention, each switching node $11(n)$ in the network 10, by comparing information received in an advertising message packet received from other switching nodes $11(n')$ to ($n' \neq n$) to the information it (that is, switching node $11(n)$) has previously received for those other switching nodes $11(n')$, it (the switching node $11(n)$) can determine whether a communication link $13(p)$ connected to the switching node $11(n')$ has malfunctioned or otherwise become inoperative. Generally, each advertising message packet broadcast by a switching node $11(n')$ will identify the communication links $13(p)$ connected thereto along with status information indicating the operational status of each respective communication link $13(p)$. Each switching node $11(n)$, when it receives an advertising message packet, can use the information in the advertising message packet to determine whether any of the communication links have malfunctioned and. If the respective switching node $11(n)$ determines from the status information that a communication link $13(p)$ has malfunctioned, it can identify the virtual circuits, if any, for which it (that is, the switching node $11(n)$) is the originating switching node $11(n_O)$ and which make use of that communication link, and may proceed to re-establish those virtual circuits using communication links which have not malfunctioned. Since the switching node $11(n)$ makes use of the advertising message packets to determine the operational status of the communication links and the respective virtual circuits which make use of them, a switching node connected to a malfunctioning communication link will not need to send special messages over each virtual circuit which makes use of the malfunctioning communication link to notify the switching nodes along the virtual circuit of the malfunction.

In addition, each communication link $13(p)$ is associated with an instance value that is incremented when the communication link $13(p)$, after having malfunctioned, is restored to operation. The switching node $11(n')$, when it broadcasts an advertising message packet, includes not only the identification of the operative communication links $13(p)$ connected thereto, but also the instance value for each of the communication links $13(p)$ identified in the advertising message packet. Each switching node $11(n)$, for each communication link $13(p)$ connected thereto, increments the instance value associated with the respective communication link $13(p)$ when the communication link $13(p)$ malfunctions and thereafter is restored to operation. Thus, the instance value associated with each communication link $13(p)$ identifies an "operational instance" of the respective communication link 13(p). Since the switching node 11(n) will increment the instance value associated with a communication link 13(p) when the communication link 13(p) malfunctions and thereafter is restored to operation, the operational instance of the communication link 13(p) after it is restored to operation is not the same operational instance as before it malfunctions.

Each switching node 11(n), along with the identification of each communication link 13(p) in the network, also maintains the instance value for the most recent "operational instance" of the respective communication link 13(p), as indicated by advertising message packets previously received by the switching node 11(n). In particular, each switching node 11(n) maintains, for each communication link 13(p) an instance value which corresponds to the maximum of the instance values provided by previously-received advertising message packets for the communication link 13(p).

When each switching node 11(n) receives such an advertising message packet, will also use the instance value associated with each communication link 13(p) to determine whether the respective communication link 13(p) has malfunctioned and thereafter been restored to operation, thereby to determine whether the operational instance indicated for the communication link 13(p) in the advertising message packet corresponds to the operational instance for the communication link 13(p) as maintained by the switching node 11(n). As indicated above, if a communication link 13(p) fails, all of the virtual circuits for which the communication link 13(p) forms part of their respective paths are dropped, regardless of whether the communication link is thereafter restored to operation. That is, for each communication link 13(p) identified in an advertising message received by the switching node 11(n), the switching node 11(n) will compare the instance value identified for the communication link in the advertising message packet to the instance value which it (that is, the switching node 11(n) has for the communication link 13(p), and:

(A) If the switching node 11(n) determines that the instance value identified for the communication link in the advertising message packet is greater than the instance value which it has for the communication link, indicating that the operational instance for the communication link 13(p) has been changed since the last advertising message packet, then the communication link 13(p) has malfunctioned and thereafter been restored to operation. In that case, the virtual circuits which use that communication link have been dropped, and the switching node 11(n) may proceed to re-establish them as necessary.

(B) On the other hand, if the switching node 11(n) determines
  (i) that the instance values are the same, or
  (ii) that the instance value associated with the communication link 13(p) in the advertising message packet is less than the instance value associated with the communication link 13(p) in the database,
then the communication link 13(p) has not malfunctioned and thereafter been restored to operation since the previous advertising message packet, and so it (that is, the switching node 11(n)) can determine that any virtual circuits which it may have that use the communication link 13(p) are themselves still operable.

Item (B)(ii) above is provided to accommodate the fact that advertising message packets may be received by the switching node 11(n) out of the order in which they were generated.

The communication link instance values are also used by the switching nodes 11(n) in connection with another context, namely, establishment of virtual circuits over the network. Generally, when an originating switching node $11(n_O)$ initiates establishment of a virtual circuit, it generates a "virtual circuit establishment" message that includes such information as the identification of the successive communication links which define the path for the virtual circuit and their respective instance values, and transmits the "virtual circuit establishment" message over the first communication link for the virtual circuit. The switching node $11(n_1)$ connected to that communication link receives the "virtual circuit establishment" message, performs such operations as establishing data structures and the like which define the virtual circuit, and transmits the "virtual circuit establishment" message over the next communication link identified in the message. Each successive switching node $11(n_2)$, $11(n_3) \ldots, 11(n_{T-1})$ along the path defined by the successive communication link identifiers in the "virtual circuit establishment" message performs a similar operation.

When the terminating switching node $11(n_T)$ receives the "virtual circuit establishment" message, it will also establish the data structures which define the virtual circuit, and generates a "virtual circuit established" message that it transmits back to the originating switching node $11(n_O)$. The "virtual circuit established" message also includes the identifications of the successive communication links which define the path for the virtual circuit, along with the respective communication links' instance values. It will be appreciated that the information in the "virtual circuit established" message generated by the terminating switching node $11(n_T)$ essentially corresponds to the information in the "virtual circuit establishment" message generated by the originating switching node $11(n_O)$. When the originating switching node $11(n_O)$ receives the "virtual circuit established" message, it can (i) verify that it all of the communication links 13(p) which are listed in the "virtual circuit established" message are currently operational; and (ii) compare the instance values associated with the communication links 13(p) which listed in the "virtual circuit established" message to the current instance values which it has for the respective communication links 13(p).

If any communication link 13(p) listed in the "virtual circuit established" message is not operational, then the originating switching node $11(n_O)$, since generating the "virtual circuit establishment" message has received an advertising message packet which indicated that the communication link 13(p) has malfunctioned, and thus that the virtual circuit will have been dropped notwithstanding the receipt of the "virtual circuit established" message packet from the terminating switching node $11(n_T)$. In that case, the originating switching node may proceed to repeat the virtual circuit establishment operation for the virtual circuit.

On the other hand, if the originating switching node $11(n_O)$ determines that the current instance value that it has for a communication link 13(p) along the path to be defined by the virtual circuit is greater than the instance value identified for a respective communication link 13(p) in the "virtual circuit established" message (item (ii) immediately above), the originating switching node $11(n_O)$ has received an advertising message packet which indicated that the operational instance for the communication link 13(p) had changed since it (that is, the originating switching node $11(n_O)$) had initiated establishment of the virtual circuit. In that case, the virtual circuit will also be deemed dropped, notwithstanding the "virtual circuit established" message from the terminating switching node $11(n_T)$. In that case also, the originating switching node may proceed to repeat the virtual circuit establishment operation for the virtual circuit.

Thus, the communication link instance values are useful, not only in connection with determining whether an established virtual circuit will need to be re-established, but also in determining whether a virtual circuit for which a "virtual circuit established" message packet has been received has actually been established or been dropped.

Figure 3:
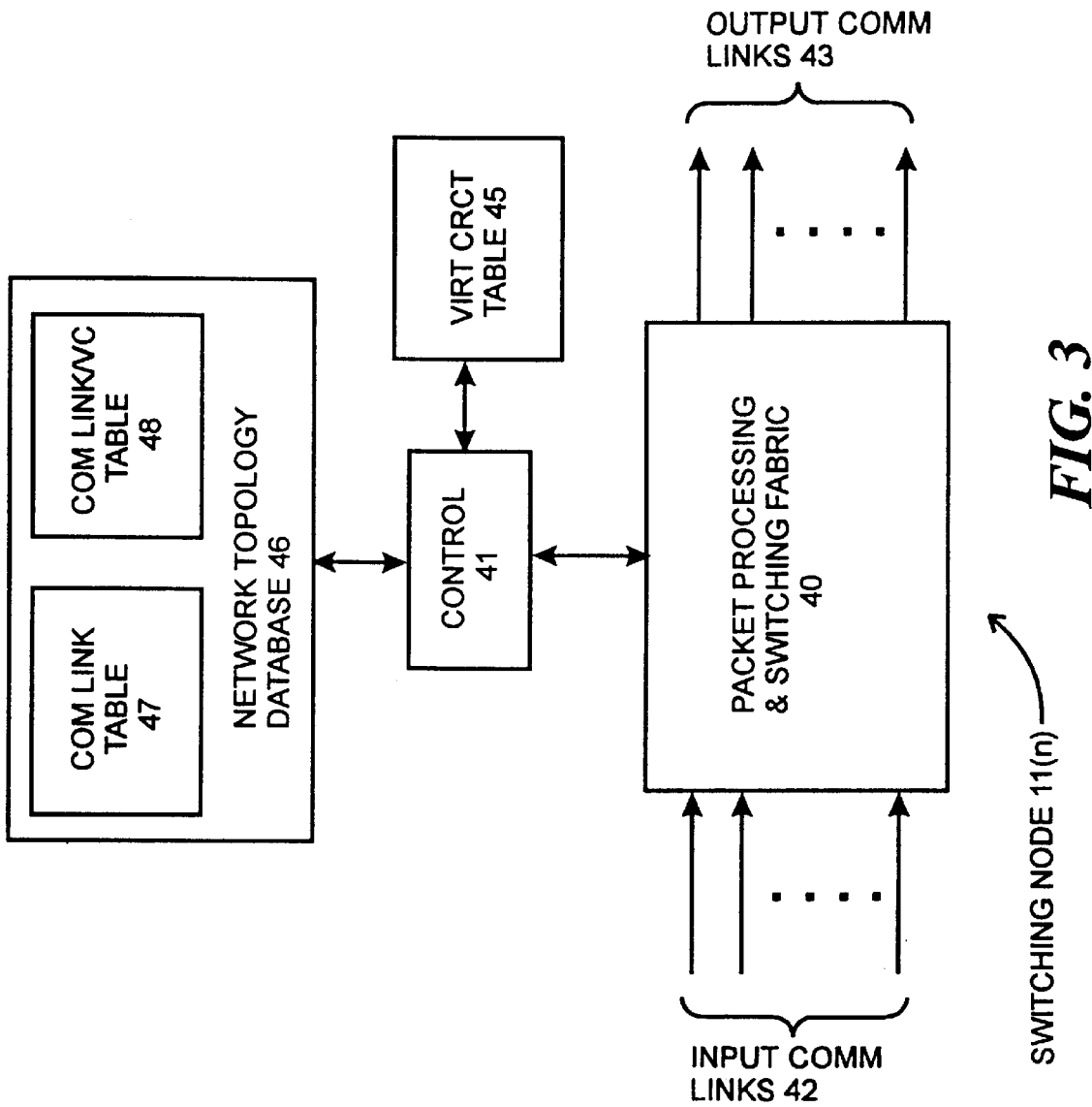
FIG. 3 depicts a functional block diagram of a switching node useful in the network depicted in FIG. 1.
Figure 2:
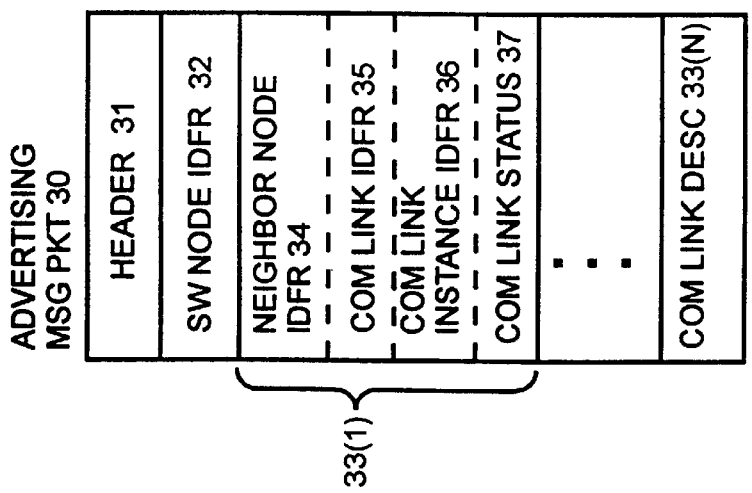
FIG. 2 depicts the structures of several a broadcast advertising message packet used in the network depicted in FIG. 1, which is useful in understanding the invention.
Figures 4, 5:
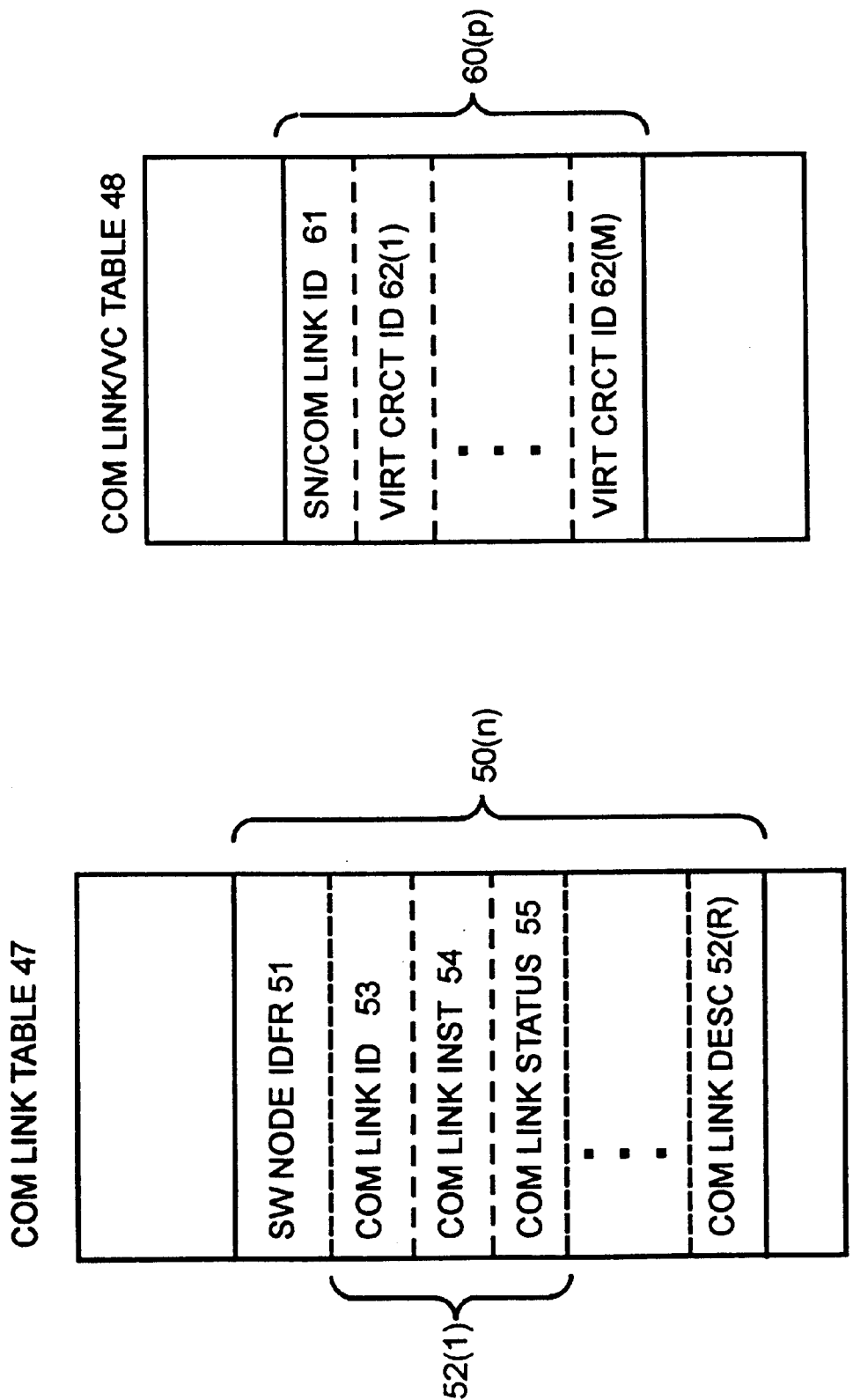
FIGS. 4 and 5 depict details of various data structures useful in understanding the operation of the switching node depicted in FIG. 3.
Figure 6:
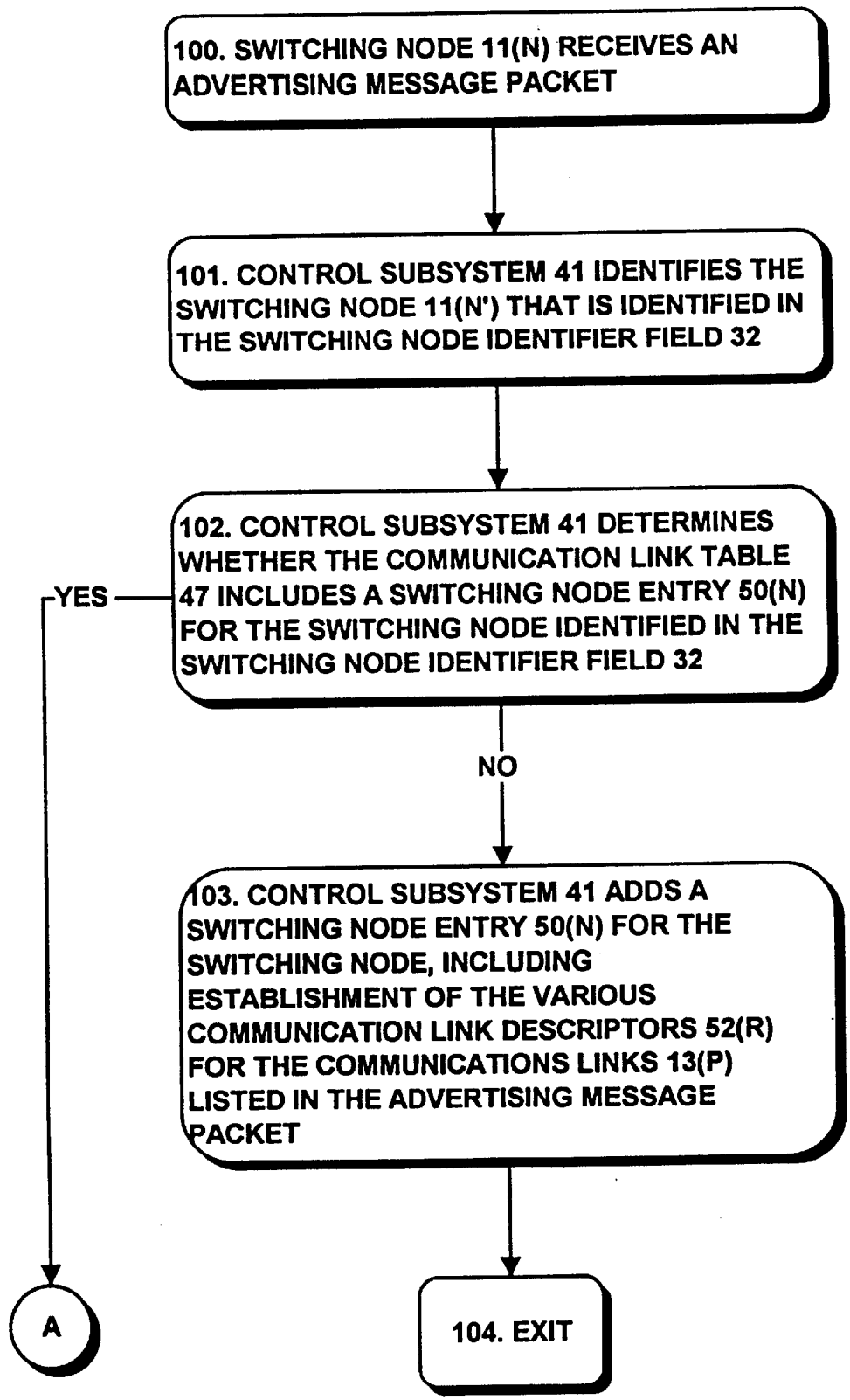
FIG. 6 is a flow chart depicting operations performed by the switching node depicted in FIG. 3, in connection with the invention.
Figure 6A:
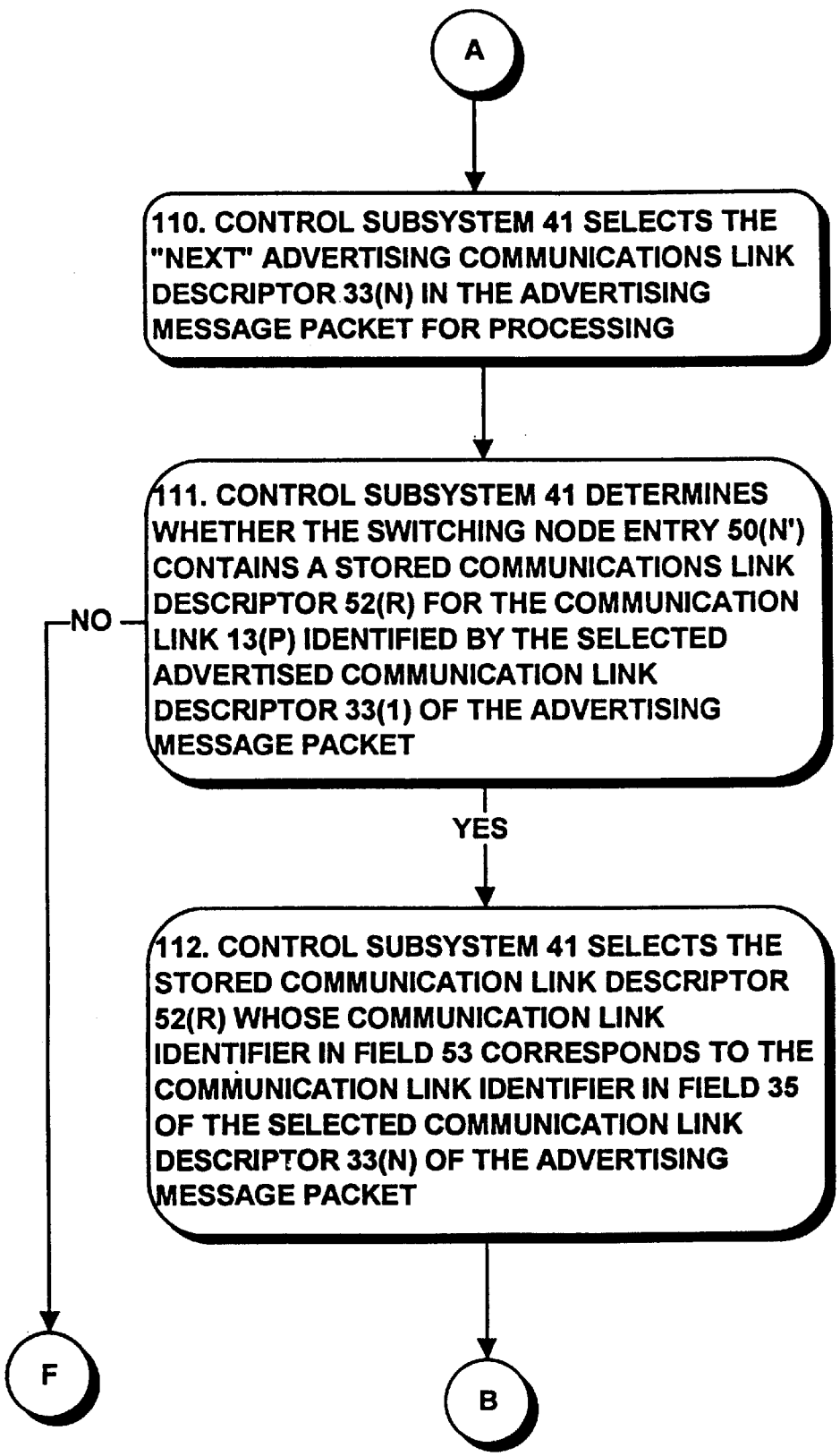
Figure 6B:
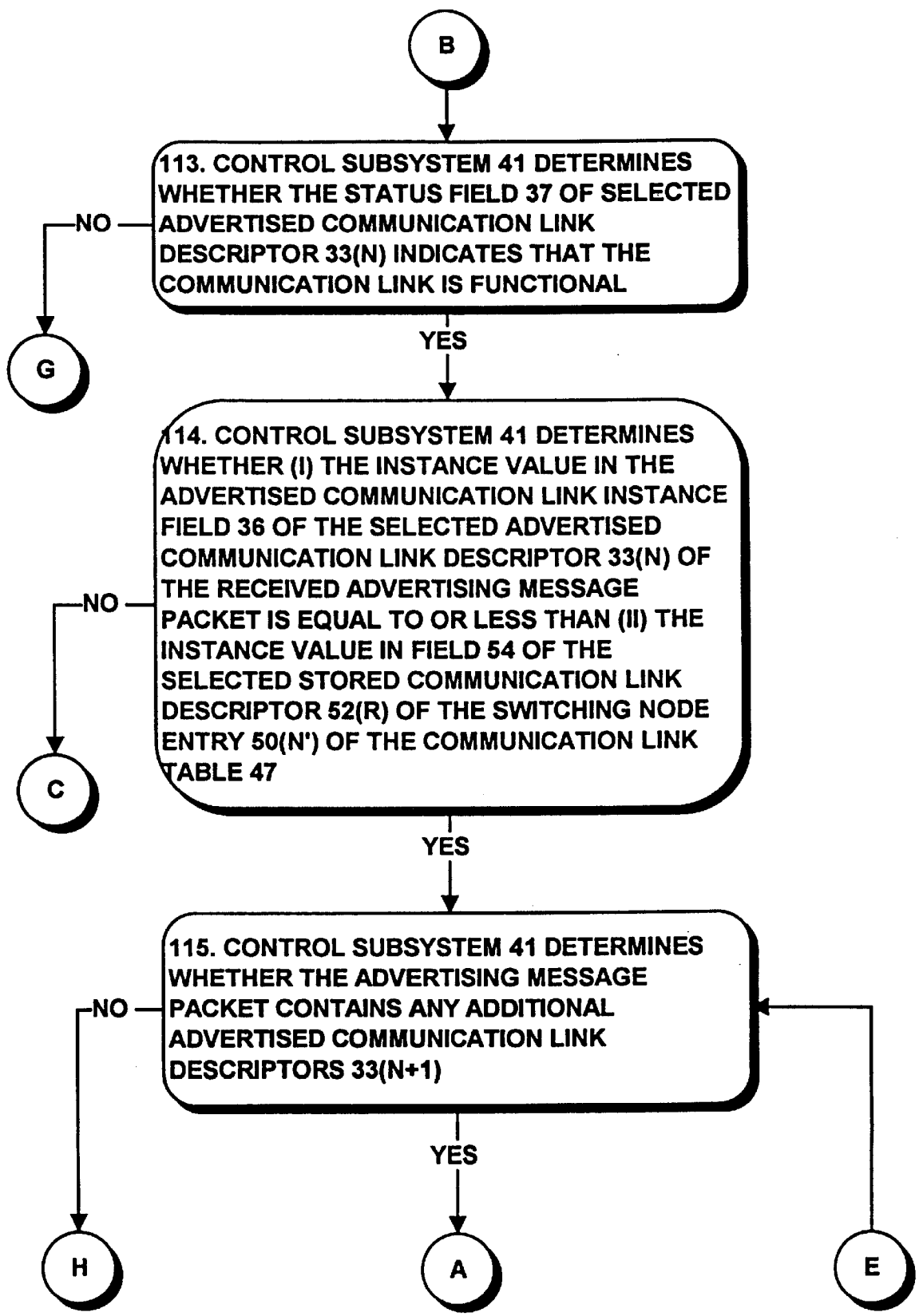
Figure 6C:
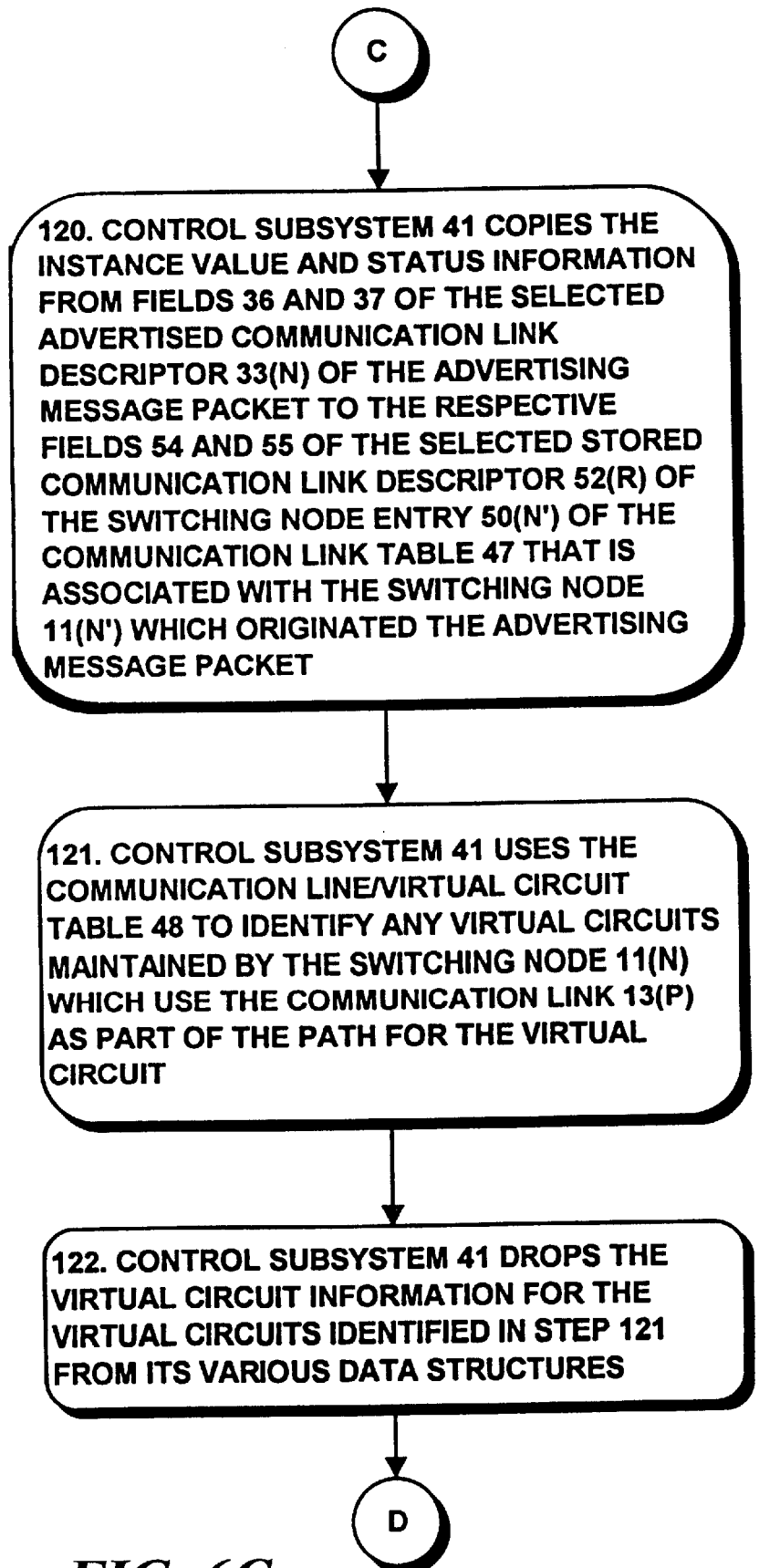
Figure 6D:
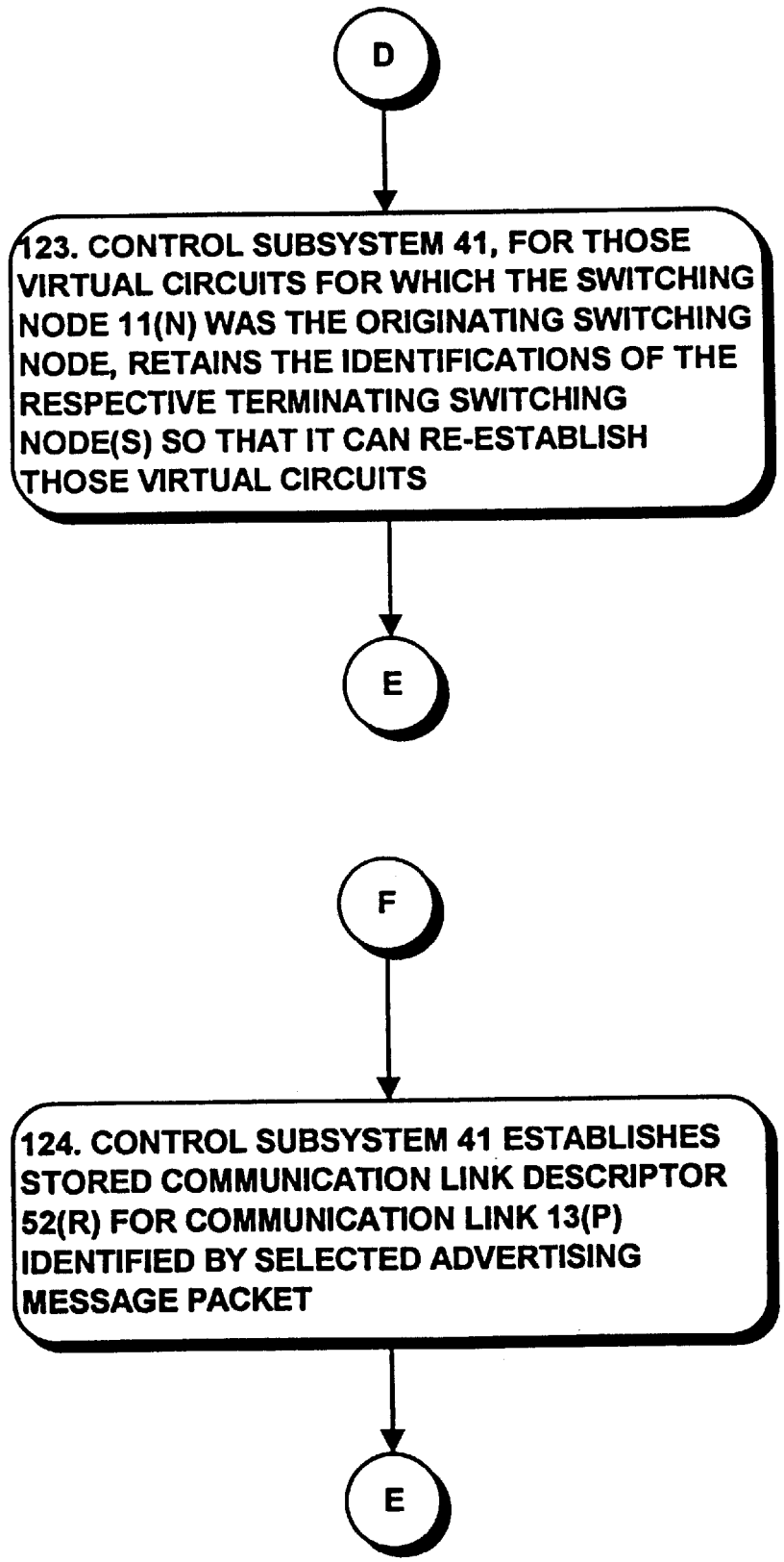
Figure 6E:
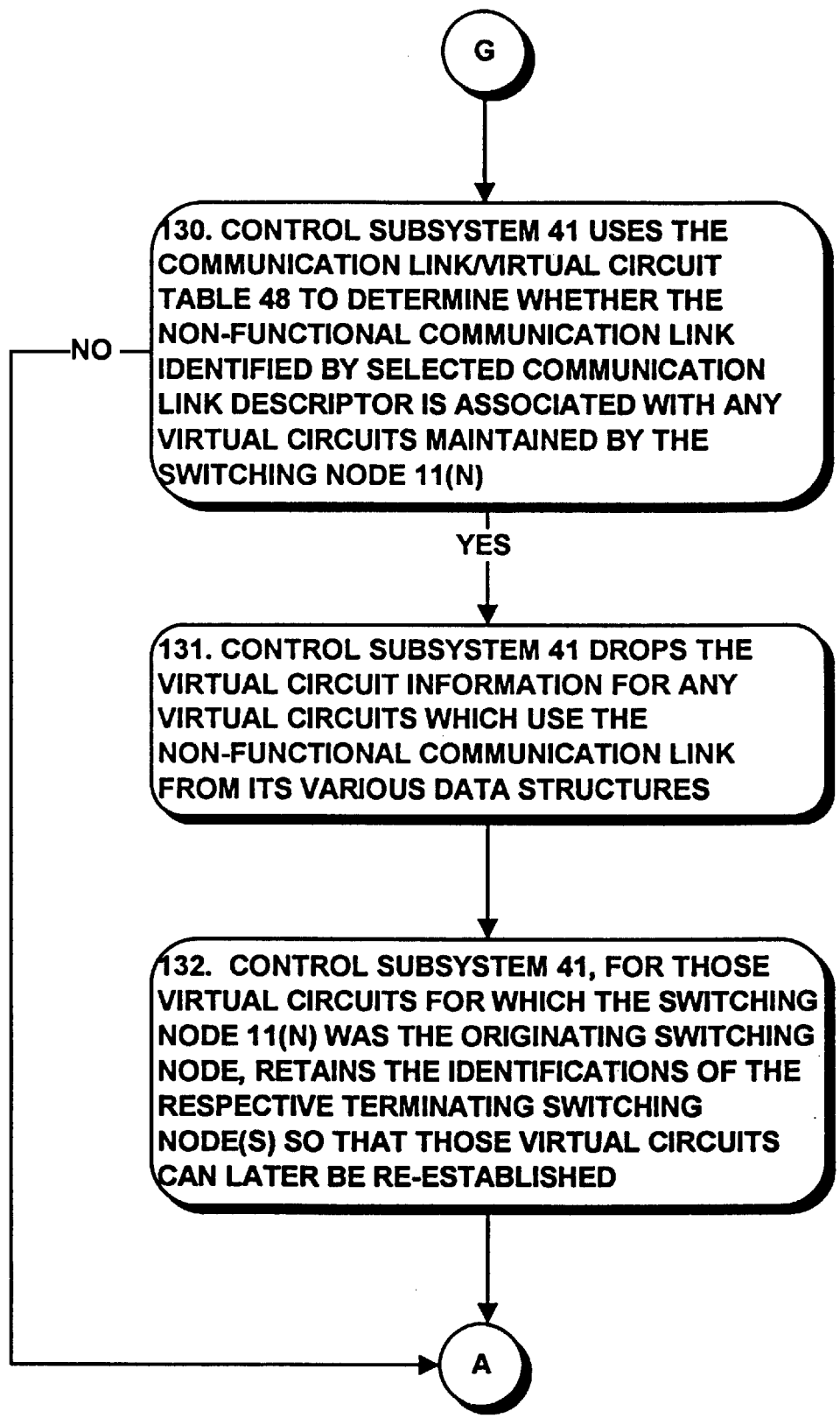
Figure 6F:
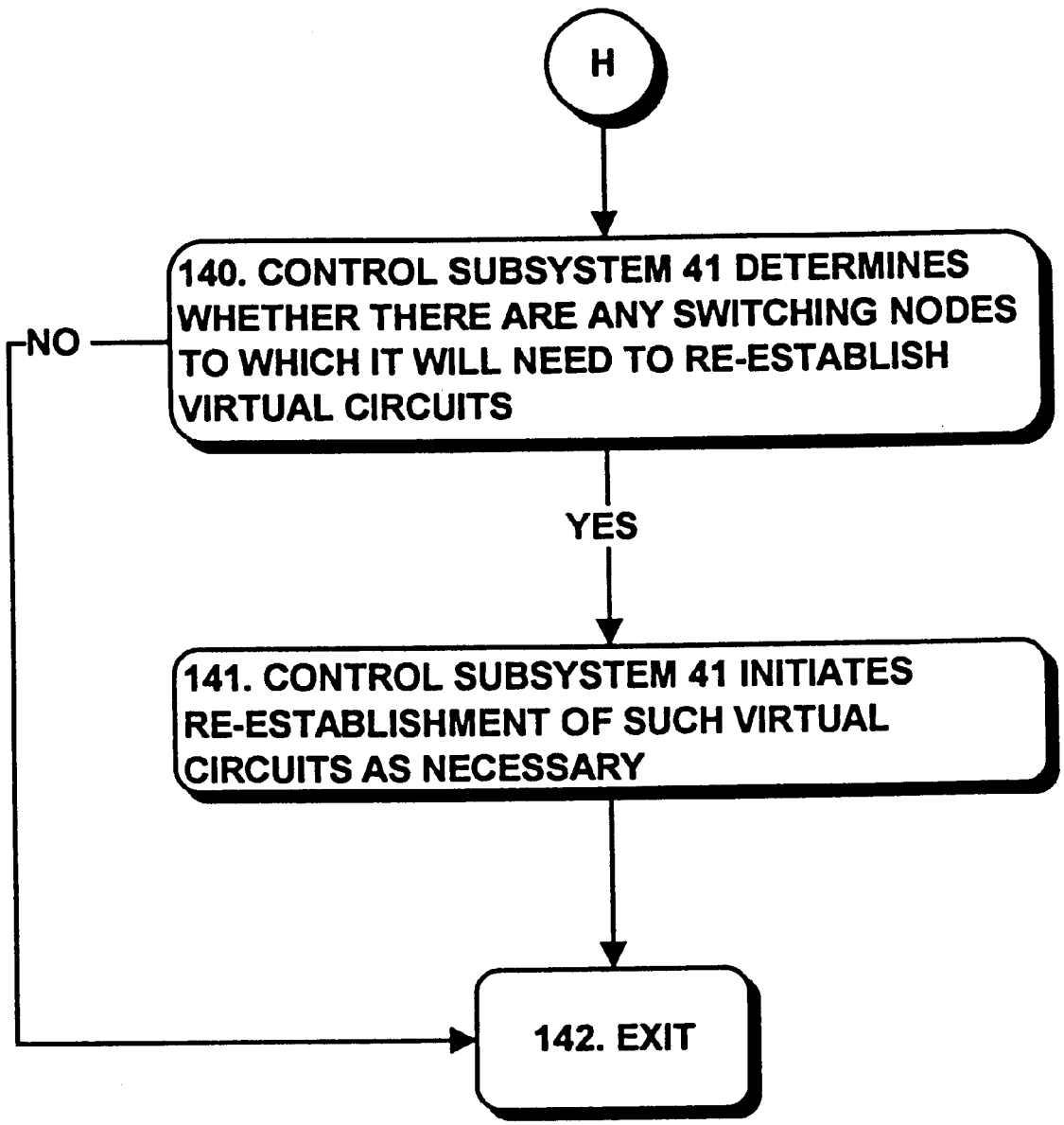

With this background, the structure and operation of network 10 in connection with the invention will be more particularly described in connection with FIGS. 2 through 6. FIG. 2 depicts the structure of an advertising message packet 20, FIG. 3 depicts a functional block diagram of a switching node useful in connection with the invention, FIGS. 4 and 5 depict details of certain data structures used by the switching node depicted in FIG. 3 in connection with the invention, and FIG. 6 is a flowchart useful in understanding the operations of the switching node depicted in FIGS. 3 through 5 in connection with the invention. With reference initially to FIG. 2, the advertising message packet 30 used in connection with the invention includes a number of fields, including a header portion 31, a switching node identifier field 32, and a plurality of advertised communication link descriptors 33($l$) through 33(N) (generally identified by reference numeral 33($n$)). The header portion 31 generally contains network protocol information useful in controlling the broadcast of the message packet 30 among the switching nodes 11($n$). Such network protocol information may include a variety of types of information, including, for example, a packet type identifier that identifies the packet as an advertising message packet and a broadcast address that indicates that the packet is to be broadcast throughout the network and received and used by all of the switching nodes 11($n$) therein, length information identifying the length of the advertising packet, and so forth. The switching node identifier field 32 contains an identifier that identifies the switching node that originally generated the advertising message packet 30. The identifier contained in switching node identifier field 32 may comprise information such as, for example, a network identifier assigned to the switching node.

Each of the advertised communication link descriptors 33($n$) of an advertising message packet 30 contains information concerning a connection of the switching node 11($n$) which originated the advertising message packet (which corresponds to the switching node identified in field 32) to another switching node 11($n'$) (n'≠n) in the network 10. Each advertised communication link descriptor 33($n$) includes several fields including a neighboring switching node identifier field 34, a communication link identifier field 35, a communication link status field 37, and, in accordance with the invention, an advertised communication link instance field 36. The neighboring switching node identifier field 34 contains an identifier that identifies the switching node 11($n'$) that is connected to the switching node 11($n$) which originated the advertising message packet, and the communication link identifier field 35 contains an identifier for the communication link 13($p$) which interconnects the switching nodes 11($n$) and 11($n'$). The advertised communication link instance field 36 identifies the current instance value for the communication link 13($p$) as determined by the switching node 11($n$) which generated the advertising message packet 30. The communication link status field 37, in turn, contains status information for the communication link 13($p$) identified in field 35. The status information includes the operational status of the associated communication link 13($p$), in particular whether the communication link is operational or malfunctioning. In addition, the status information may also include, for example, certain information which can be useful in connection with selection of paths through the network, including, for example, communication cost information, available bandwidth for the communication link, and the like.

The advertising message packet 30 may also include other fields (not shown), including, for example, identification of the computer systems 12($m$) and other devices which are connected to the switching node 11($n$) which originated the advertising message packet, identification of various "applications," broadly considered, which may be available through the switching node 11($n$), and the like.

A functional block diagram of a switching node 11($n$) useful in connection with the invention is depicted in FIG. 3. With reference to FIG. 3, the switching node 11($n$) includes a packet processing and switching fabric subsystem 40 and a control subsystem 41. Generally, the packet processing and switching fabric subsystem 40 receives message packets from ones of the communication links 13($p$) connected thereto as input communication links generally identified by reference numeral 42, and transmits message packets over others of the communication links 13($p$) connected thereto as output communication links generally identified by reference numeral 43, under control of the control subsystem 41. The control subsystem 41 controls the operations of the switching node 11($n$), including establishment and dropping of virtual circuits, receipt and use of information from advertising message packets generated by other switching nodes 11($n'$) (n'≠n), generation and broadcast of advertising message packets to other switching nodes 11($n'$), and transfer of message packets over the various virtual circuits in which the switching node 11($n$) is included. Operations performed by one embodiment in connection with transfer of message packets over the respective communication links are generally conventional, and will not be described in detail herein.

The control subsystem 41 makes use of several tables for controlling the operations of the packet processing and switching fabric 40, including a virtual circuit table 45, and a network topology database 46. The virtual circuit table 45 contains information for each of the various virtual circuits in which the switching node 11($n$) is included. The control subsystem 41 uses the information in the virtual circuit table 45 to identify a particular one of the output communication links 43 over which the virtual circuit packet is to be transmitted, for each virtual circuit packet 30 generated by the switching node 11($n$) as originating switching node 11($n_O$) or received by the switching node 11($n$) from an input communication link 42 as an intermediate switching node 11($n_1$) along the path to the terminating switching node 11($n_T$) for the virtual circuit. In addition, the virtual circuit table 45 indicates whether the switching node 11($n$) is the terminating switching node for the virtual circuit.

In one particular embodiment, each switching node 11($n$) can actually make use of several virtual circuit identifier values which identify each virtual circuit, including:

(i) a "received" virtual circuit identifier value for virtual circuit packets that are received from another switching node 11($n'$) (n'≠n), and (ii) a "transmitted" virtual circuit identifier value that is used in transmitting the virtual circuit packet over one of the output communication links 43 to another switching node 11($n''$) (n''≠n', n), and the virtual circuit table 45 will identify each of the virtual circuit identifier values along with the identification of the output communication link 43 over which the virtual circuit packet 30 is to be transmitted.

In accordance with the invention, the control subsystem 41 makes use of data structures, identified herein as a communication link table 47 and a communication link/virtual circuit table 48, both of which may be integrated with and form part of the network topology database 46. The communication link table 47 identifies the operational status information and the instance value associated with each communication link 13(*p*) in the network. As will be described below in greater detail, the switching node 11(*n*) uses the communication link table 47, when it receives an advertising message packet, to determine whether the instance value for any communication link 13(*p*) identified in the advertising message packet is greater than that stored in the communication link table 47 for the communication link 13(*p*), which will occur if the communication link 13(*p*) has malfunctioned and returned to operation. As described above, if that occurs, any virtual circuits maintained by the switching node 11(*n*) which use that communication link 13(*p*) will have been dropped, and the switching node 11(*n*) will need to update its switching node/virtual circuit table and virtual circuit table accordingly. In addition, the switching node 11(*n*) will update the communication link table 47 to indicate the new instance value for the communication link 13(*p*).

FIG. 4 depicts details of the communication link table 47 useful in one embodiment of the invention. With reference to FIG. 4, the communication link table 47 includes a number of switching node entries 50(*l*) through 50(N) (generally identified by reference numeral 50(*n*)) each of which is associated with one of the switching nodes 11(*n*) in the network. A switching node entry in the table maintained by switching node 11(*n*) is provided for each of the other switching nodes 11(*n'*) (n'≠n) in the network, and one switching node entry may also be may be provided for the switching node 11(*n*) which maintains the communication link table 47.

Each switching node entry 50(*n*) in the communication link table 47 includes a switching node identifier field 51 and a plurality of stored communication link descriptors 52(*l*) through 52(R) (generally identified by reference numeral 52(*r*)). The switching node identifier field 51 contains an identifier for the particular one of the switching nodes in the network with which the switching node entry is associated. Each stored communication link descriptors 52(*r*) in the switching node entry 50(*n*) are associated with a respective one of the communication links 13(*p*) which are connected to the switching node 11(*n*) identified in the switching node identifier field 51, and contains information for the communication link 13(*p*) with which it is associated.

In particular, each stored communication link descriptor 52(*r*) includes a communication link identifier field 53, a stored communication link instance field 54 and a communication link status field 55. The communication link identifier field 53 contains a communication link identifier that identifies the communication link 13(*p*) with which the communication link descriptor 52(*r*) is associated.

The stored communication link instance field 54 of each stored communication link descriptor 52(*r*) contains the communication link instance value associated with the communication link 13(*p*) identified by the communication link identifier field 53, as maintained by the switching node 11(*n*). If the stored communication link descriptor 52(*r*) forms part of a switching node entry 50(*n*) associated with the switching node 11(*n*) which maintains the communication link table 47, which will be the case if the communication link 13(*p*) associated with the communication link descriptor 52(*r*) is connected to that switching node 11(*n*), the switching node 11(*n*) itself (in particular, the control subsystem 41) will control the communication link instance value in field 54, and can use that value in advertising message packets which it (that is, the switching node 11(*n*)) generates for broadcast through the network 10. On the other hand, if the stored communication link descriptor 52(*r*) forms part of a switching node entry 50(*n'*) associated with another switching node 11(*n'*) (n'≠n), the communication link instance value in stored communication link instance field 54 will be controlled in response to advertising message packets that the switching node 11(*n*) receives from the other switching node 11(*n'*) as described above.

Finally, the communication link status field 54 of each communication link descriptor 52(*r*) contains the above-described status information for the respective communication link identified in communication link identifier field 53, in particular indicating whether the respective communication link is operational or malfunctioning.

FIG. 5 depicts details of the communication link/virtual circuit table 48 which are useful in one embodiment of the invention. With reference to FIG. 5, the communication link/virtual circuit table 48 also includes a number of entries, generally identified by reference numeral 60(*p*), each associated with one of the communication links 13(*p*) in the network 10. Each entry 60(*p*) includes a communication link identifier field 61, which identifies the communication link 13(*p*) associated with the entry 60(*p*). In addition, if the switching node 11(*n*) which maintains the communication link/virtual circuit table 48 is associated with one or more virtual circuits over the communication link 13(*p*) identified in field 61, the entry 60(*p*) includes a corresponding number of virtual circuit identifier fields 62(*l*) through 62(M) (generally identified by reference numeral 62(*m*)) which contain the identifiers of the respective virtual circuits which the switching node 11(*n*) maintains over the communication link 13(*p*) identified in field 61. When the switching node 11(*n*) determines that a communication link 13(*p*) has malfunctioned, it can determine whether the table 48 contains an entry 60(*p*) whose communication link identifier field 61 identifies the malfunctioned communication link 13(*p*) whether the switching node 11(*n*) is associated with any virtual circuits and, if so update its various data structures to reflect the fact that those virtual circuits have been dropped. In addition, if the switching node 11(*n*) is the originating switching node 11(*n$_O$*) for any of the virtual circuits which have been dropped, it can initiate operations to re-establish the virtual circuits.

It will be appreciated that, if the communication link/virtual circuit table 48 does not have an entry 60(*p*) whose communication link identifier field 61 identifies the malfunctioned communication link 13(*p*), the switching node 11(*n*) which maintains the table 48 does not have any virtual circuits which make use of the malfunctioned communication link 13(*p*).

FIG. 6 is a flowchart depicting detailed operations performed by a switching node 11(*n*), in particular the control subsystem 41, in connection with the invention. Preliminarily, operations performed by the control subsystem in generating advertising message packets are generally conventional, except for the fact that the advertising message packets include communication link instance values for the respective communication links 13(*p*) connected thereto in the respective advertised communication link instance fields 36 (FIG. 2) of the advertised communication link descriptors 33(*n*) as described above. Accordingly, operations performed by the control subsystem 41 in generating advertising message packets will not be described in detail in connection with FIG. 6. In addition, operations performed in connection with forwarding of the advertising message packet over the output communication links 43 (FIG. 3) to effect flooding of the advertising message packet throughout the network 10 are conventional and will not be described in connection with FIG. 6. Instead, the flowchart in FIG. 6 will depict only operations performed by the control subsystem 41 in response to receipt of an advertising message packet and its use of the information contained therein.

With reference to FIG. 6, when a switching node 11(n) receives an advertising message packet (step 100), the control subsystem 41 identifies the switching node 11(n') (n'≠n) that is identified in switching node identifier field 32 (FIG. 2) (step 101) and determines whether the communication link table 47 includes a switching node entry 50(n) for the switching node identified in the switching node identifier field 32 (step 102). If the control subsystem 41 makes a negative determination in step 102, the switching node 11(n') is a new switching node in the network. In that case, the control subsystem 41 sequences to step 103 to add a switching node entry 50(n) for the switching node, including establishment of the various communication link descriptors 52(r) for the communication links 13(p) listed in the advertising message packet. In addition, the control subsystem 41 may perform operations to initiate establishment of a virtual circuit from the switching node 11(n) to the new switching node 11(n'). Thereafter, the control subsystem 41 will exit (step 104)

Returning to step 102, if the control subsystem 41 makes a positive determination in that step, the communication link table 47 includes a switching node entry 50(r) for the switching node 11(n') which originated the advertising message packet received in step 100. In that case, the switching node 11(n) sequences to a series of operations, beginning with step 110, to, in a series of iterations, process each of the advertised communication link descriptors 33(n) in the advertising message packet. Initially in step 110, the control subsystem 41 selects the "next" advertising communication link descriptor 33(n) in the advertising message packet for processing. In the first iteration, the control subsystem 41 can select, for example, the first communication link descriptor field 33(l). The control subsystem 41 then determines whether the switching node entry 50(n') contains a stored communication link descriptor 52(r) for the communication link 13(p) identified by the selected advertised communication link descriptor 33(l) of the advertising message packet (step 111), using the communication link identifiers in field 53 of successive ones of the communication link descriptors 52(r) of the switching node entry 50(n'). If the control subsystem 41 makes a positive determination in step 111, it selects the stored communication link descriptor 52(r) for which the communication link identifier in field 53 corresponds to the communication link identifier in field 35 of the selected communication link descriptor 33(n) of the advertising message packet (step 112) for subsequent operations during the iteration.

After selecting a stored communication link descriptor 52(r) in the communication link table 47 (FIG. 3) in step 112, the control subsystem 41 determines the status field 37 of the selected communication link descriptor 33(n) indicates whether the communication link is functional or whether it has malfunctioned (step 113). If the control subsystem 41 determines in step 113 that the descriptor 33(n) indicates that the communication link 13(p) is functional, it proceeds to determine whether (i) the instance value in the advertised communication link instance field 36 of the selected advertised communication link descriptor 33(n) of the received advertising message packet is equal to or less than (ii) the instance value in field 54 of the selected stored communication link descriptor 52(r) of the switching node entry 50(n') of the communication link table 47 (step 114).

If the control subsystem 41 makes a positive determination in step 114, the communication link 13(p) associated with the advertised communication link descriptor 33(n) of the received advertising message packet has not malfunctioned. In that case, the control subsystem 41 will determine whether the advertising message packet contains any additional advertised communication link descriptors 33(n+1) (step 115). If the control subsystem makes a positive determination in step 115, it will return to step 110 to select the next advertised communication link descriptor 33(n+1) and begin another iteration therewith.

Returning to step 114, if the control subsystem 41 makes a negative determination in that step, the instance value in field 36 of the selected advertised communication link descriptor 33(n) of the received advertising message packet is greater than the instance value in field 54 of the selected communication link descriptor 52(r) of the switching node entry 50(n') of the communication link table 47. When that occurs, the communication link 13(p) identified by the communication link identifier in field 35 of the selected communication link descriptor 33(n) (which is the same communication link 13(p) as that identified by the communication link identifier in field 53 of the communication link table 47) has malfunctioned and subsequently returned to operation, and so virtual circuits which use that communication link 13(p) will have been dropped.

In that case, the control subsystem 41 associated with switching node 11(n) will initially copy the instance value (i) from the advertised communication link instance field 36 of the selected advertised communication link descriptor 33(n) of the advertising message packet (ii) to the stored communication link instance field 54 of the selected stored communication link descriptor 52(r) of the switching node entry 50(n') of the communication link table 47 that is associated with the switching node 11(n') which originated the advertising message packet (step 120).

In addition, the control subsystem 41 will use the communication link/virtual circuit table 48 to identify any virtual circuits maintained by the switching node 11(n) which use the communication link 13(p) as part of the path for the virtual circuit (step 121). Thereafter, the control subsystem 41 will drop the virtual circuit information for the virtual circuits identified in step 120 from its various data structures as described above (step 122). The control subsystem 41 will, for those virtual circuits for which the switching node 11(n) was the originating switching node 11($n_O$), retain the identifications of the respective terminating switching node (s) 11($n_T$) so that those virtual circuits can later be re-established (step 123). Thereafter, the control subsystem 41 sequences to step 115 to determine whether the advertising message packet contains any additional advertised communication link descriptors 33(n+1) and, if so, return to step 110 to select the next advertised communication link descriptor 33(n+1) and begin another iteration therewith.

Returning to step 111, if the control subsystem makes a negative determination in that step, which can occur if, for example, a communication link 13(p) is added to the switching node 11(n') which originated the advertising message packet received in step 100, it (that is, the control subsystem 41) sequences to step 124 to generate a new stored communication link descriptor 52(r) for the switching node entry 50(n') for the switching node 11(n'). Thereafter, the control subsystem 41 sequences to step 115 to determine whether the advertising message packet contains any additional advertised communication link descriptors 33(n+1) and, if so, return to step 110 to select the next advertised communication link descriptor 33(n+1) and begin another iteration therewith.

Returning to step 113, if the control subsystem 41 determines in that step that the status field 37 of the selected communication link descriptor 33(n) indicates that the associated communication link is malfunctioning, it will sequence to a series of steps 130 in which it will perform operations similar to those described above in connection with steps 121 through 123 to (i) use the communication link/virtual circuit table 48 to identify any virtual circuits maintained by the switching node 11(n) which use the communication link 13(p) as part of the path for the virtual circuit (step 130);

(ii) drop the virtual circuit information for the virtual circuits identified in step 130 from its various data structures as described above (step 131); and (iii) for those virtual circuits for which the switching node 11(n) was the originating switching node 11($n_O$), retain the identifications of the respective terminating switching node(s) 11($n_T$) so that those virtual circuits can later be re-established (step 132).

Following step 130, the control subsystem 41 will sequence to step 115 to determine whether the advertising message packet contains any additional communication link descriptors 33(n+1), and, if so, returns to step 110 to select the next communication link descriptor for processing.

The control subsystem 41 will repeat the operations described above for each communication link descriptor 33(n) in the advertising message packet. When the control subsystem 41 determines in step 115 that there are no additional communication link descriptors in the advertising message packet, it will sequence to step 140 to determine whether there are any switching nodes to which it will need to re-establish virtual circuits. If the control subsystem 41 makes a positive determination in step 140, it will proceed to step 141 to initiate re-establishment of such virtual circuits, and thereafter will exit (step 142). On the other hand, if the control subsystem 41 makes a negative determination in step 140, it will proceed directly to step 142 to exit.

The invention provides a number of advantages. In particular, it provides a new and improved mechanism by which switching nodes 11(n) can notify each other when communication links 13(p) connected thereto malfunction or otherwise become operative, so that the switching nodes 11(n) can determine when virtual circuits which use the communication links have been dropped, without the necessity of requiring the switching nodes 11(n) to generate messages of a particular type for transfer over paths defined by the dropped virtual circuits to notify the switching nodes 11(n) therealong that the virtual circuits have been dropped. Thus, the invention can facilitate a simplification of the switching nodes, since they would not need be provided with the facilities required to generate the particular type of message. In addition, the invention can increase the amount of network bandwidth available for other types of messages, since messages of that particular type need not be generated.

Furthermore, by using the instance values for each communication link 13(p) in the advertising message packets, each of the respective switching nodes 11(n) can determine whether a communication link 13(p) has remained functional between advertising message packets received by the respective switching node 11(n), or whether the communication link 13(p) has malfunctioned and returned to functionality between received advertising message packets. In addition, the instance values can be useful if, for example, a switching node 11(n) receives advertising message packets out of order. When a switching node 11(n) determines that a later-received advertising message packet has a lower instance value than an earlier-received advertising message packet, the later-received advertising message packet was generated before the later-received packet, and the switching node 11(n) can ignore the later-received packet.

Furthermore, the instance values can be useful during establishment of a virtual circuit, in verifying that a virtual circuit has been properly established. As described above, to establish a virtual circuit, a switching node 11(n), as originating switching node, generates a "virtual circuit establishment" message that includes such information as the identification of the successive communication links which define the path for the virtual circuit and their respective instance values, and transmits it over the path for the virtual circuit to the terminating switching node 11($n_T$). The terminating switching node, in turn, generates an acknowledgment message acknowledging the virtual circuit establishment. Both the establishment and acknowledgment messages include the communication link instance values, and, when the originating switching node 111($n_O$) receives the acknowledgment message, it can use the communication link instance values identified in the acknowledgment message to verify that the communication link instances for which the virtual circuit was established are the current communication link instances for the respective communication links as maintained in its network topology database. If the communication link instances values in the acknowledgment message correspond to the current instance values, the originating switching node 11($n_O$) can verify that the virtual circuit was properly established and operational. However, if a communication link instance value in the acknowledgment message does not correspond to the current instance value, the originating switching node will determine that a communication link had malfunctioned during the virtual circuit establishment operation, and proceed to re-establish the virtual circuit.

It will be appreciated that a number of modifications may be made to the network 10 as described above in connection with FIGS. 1 through 6. For example, although the invention has been described in connection with use of data structures as described above in connection with FIGS. 3 through 5, it will be appreciated that data structures may be used having a variety of structures and organizations.

It will be appreciated that a system in accordance with the invention can be constructed in whole or in part from special purpose hardware or a general purpose computer system, or any combination thereof, any portion of which may be controlled by a suitable program.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A network comprising a plurality of nodes interconnected by communication links, the nodes transferring message packets thereamong over said communication links over paths defined through said nodes over said communication links, A. at least one of said nodes including:
  i. a communication link operational status determination element for determining the operational status of said at least one communication link;
  ii. a communication link instance identifier for providing a communication link instance value of at least one communication link connected to said at least one of said nodes;
  iii. a communication link instance identifier control for controlling the communication link instance value provided by the communication link instance identifier in relation to the operational status determined by the communication link operational status determination element, the advertising message packet broadcast element further broadcasting advertising message packets at least some of which include said communication link instance value; and
  iv. an advertising message packet broadcast element for broadcasting advertising message packets over said network, at least some of said advertising message packets including the operational status of said at least one communication link and said communication link instance value; and
B. at least one other of said nodes receiving said advertising message packets and determining from the operational status and communication link instance value contained therein whether to initiate a re-routing operation to re-route a said path maintained by said at least one other of said nodes to avoid said at least one communication link.

2. A network as defined in claim 1 in which said at least one other of said nodes further includes a virtual circuit establishment control element to control establishment of a virtual circuit to another of said nodes over selected ones of said communication links, the virtual circuit establishment control element receiving a virtual circuit establishment acknowledgment message including an communication link instance value for each of the selected communication links, the virtual circuit establishment control element determining an operational status for the virtual circuit from the communication link instance values for the selected communication links and the communication link instance identifiers for the communication links from the advertising message packets.

3. A node for use in a network comprising a plurality of nodes interconnected by communication links, the nodes transferring message packets thereamong over said communication links over paths defined through said nodes over said communication links, said node comprising:
A. a communication link instance identifier for providing a communication link instance value of at least one communication link connected to said at least one of said nodes;
B. a communication link operational status determination element for determining the operational status of said at least one communication link;
C. a communication link instance identifier control for controlling the communication link instance value provided by the communication link instance identifier in relation to the operational status determined by the communication link operational status determination element; and
D. an advertising message packet broadcast element for broadcasting advertising message packets over said network, at least some of said advertising message packets including the operational status providing by said communication link operational status determination element and the communication link instance value provided by said communication link instance identifier for said at least one communication link.

4. A node for use in a network comprising a plurality of nodes interconnected by communication links, the nodes transferring message packets thereamong over said communication links over paths defined through said nodes over said communication links, said node comprising:
A. an advertising message packet receiver for receiving advertising message packets, at least one advertising message packet including a communication link instance value and an operational status for at least one communication link;
B. a communication link instance identifier for storing a current communication link instance value for said at least one communication link;
C. a re-route operation initiator for controlling initiation of a re-routing operation to re-route a path around said at least one communication link in response to said communication link instance value and operational status for said at least one communication link as received in a said advertising message packet by said advertising message packet receiver and the current communication link identifier value provided by said communication link instance identifier.

5. A method of controlling network comprising a plurality of nodes interconnected by communication links, the nodes transferring message packets thereamong over said communication links over paths defined through said nodes over said communication links, the method comprising the steps of:
A. for at least one of said nodes:
  i. providing a communication link instance value of at least one communication link connected to said at least one of said nodes;
  ii. determining the operational status of said at least one communication link;
  iii. controlling the communication link instance value in relation to the operational status; and
  iv. broadcasting advertising message packets over said network, at least some of said advertising message packets including the operational status and communication link instance value of said at least one communication link; and
B. for at least one other of said nodes, receiving said advertising message packets and determining from the operational status and communication link instance value contained therein whether to initiate a re-routing operation to re-route a said path maintained by said at least one other of said nodes to avoid said at least one communication link.

6. A method of controlling a node for use in a network comprising a plurality of nodes interconnected by communication links, the nodes transferring message packets thereamong over said communication links over paths defined through said nodes over said communication links, said method comprising the steps of
A. providing a communication link instance value of at least one communication link connected to said at least one of said nodes;
B. determining the operational status of said at least one communication link;
C. controlling the communication link instance value in relation to the operational status; and D. an advertising message packet broadcast element for broadcasting advertising message packets over said network, at least some of said advertising message packets including the operational status and the communication link instance value for said at least one communication link.

7. A method of controlling a node for use in a network comprising a plurality of nodes interconnected by communication links, the nodes transferring message packets thereamong over said communication links over paths defined through said nodes over said communication links, said method comprising the steps of:

A. for receiving advertising message packets, at least one advertising message packet including a communication link identifier value and an operational status for at least one communication link;

B. storing a current communication link identifier value for said at least one communication link; and C. controlling initiation of a re-routing operation to re-routing a path around said at least one communication link in response to said communication link identifier value and operational status for said at least one communication link as received in a said advertising message packet and the current communication link identifier value.

* * * * *